United States Patent
Cho et al.

(10) Patent No.: US 11,115,572 B2
(45) Date of Patent: Sep. 7, 2021

(54) AUTOMATIC FOCUSING SYSTEM, METHOD, AND VEHICULAR CAMERA DEVICE THEREFOR

(71) Applicant: TRIPLE WIN TECHNOLOGY (SHENZHEN) CO. LTD., Shenzhen (CN)

(72) Inventors: Yu-An Cho, New Taipei (TW); Nai-Cyun Ke, New Taipei (TW); Che-Ming Liu, New Taipei (TW)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 45 days.

(21) Appl. No.: 16/667,288

(22) Filed: Oct. 29, 2019

(65) Prior Publication Data
US 2021/0053505 A1 Feb. 25, 2021

(30) Foreign Application Priority Data

Aug. 22, 2019 (CN) .......................... 201910780853.4

(51) Int. Cl.
*H04N 5/232* (2006.01)
*G03B 13/00* (2021.01)
*H04N 5/225* (2006.01)
*C22F 1/00* (2006.01)

(52) U.S. Cl.
CPC ......... *H04N 5/2253* (2013.01); *H04N 5/2254* (2013.01); *H04N 5/2257* (2013.01); *C22F 1/006* (2013.01)

(58) Field of Classification Search
CPC .. H04N 5/2253; H04N 5/2254; H04N 5/2257; H04N 5/2328; H04N 5/23258; H04N 5/23287; H04N 5/23212; H04N 5/23219; C22F 1/006; G02B 27/646; G02B 7/04; G02B 7/09; G02B 7/28; G03B 13/36; G03B 13/34; G03B 13/32
See application file for complete search history.

(56) References Cited

U.S. PATENT DOCUMENTS

| | | | |
|---|---|---|---|
| 8,159,762 B2 * | 4/2012 | Lim | G03B 5/00 359/823 |
| 2001/0025477 A1 * | 10/2001 | Hara | F03G 7/065 60/772 |
| 2006/0182433 A1 * | 8/2006 | Kawahara | H04N 5/23219 396/123 |
| 2015/0042789 A1 * | 2/2015 | Inwood | H04W 52/0254 348/135 |
| 2019/0258136 A1 | 8/2019 | Yu et al. | |

FOREIGN PATENT DOCUMENTS

CN 110082882 A 8/2019

* cited by examiner

*Primary Examiner* — Kelly L Jerabek
(74) *Attorney, Agent, or Firm* — ScienBiziP, P.C.

(57) ABSTRACT

A camera device in or on a vehicle includes a lens module, a driving module having at least one shape memory alloy wire, and a converting module. The camera device is connected to a control device and receives control signals from the control device. The control signal drives the lens module to move for purpose of automatic focusing by applying heat to energize or de-energize the length or shape of the shape memory alloy wire.

12 Claims, 3 Drawing Sheets

AUTOMATIC FOCUSING SYSTEM, METHOD, AND VEHICULAR CAMERA DEVICE THEREFOR

FIELD

The disclosure generally relates to imaging.

BACKGROUND

When a camera is fitted to a vehicle the focus of such camera is mostly fixed. However, the fixed focus camera generally can only obtain images within a fixed range, for example, one meter. Such a focusing system of a camera may not satisfy all requirements.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
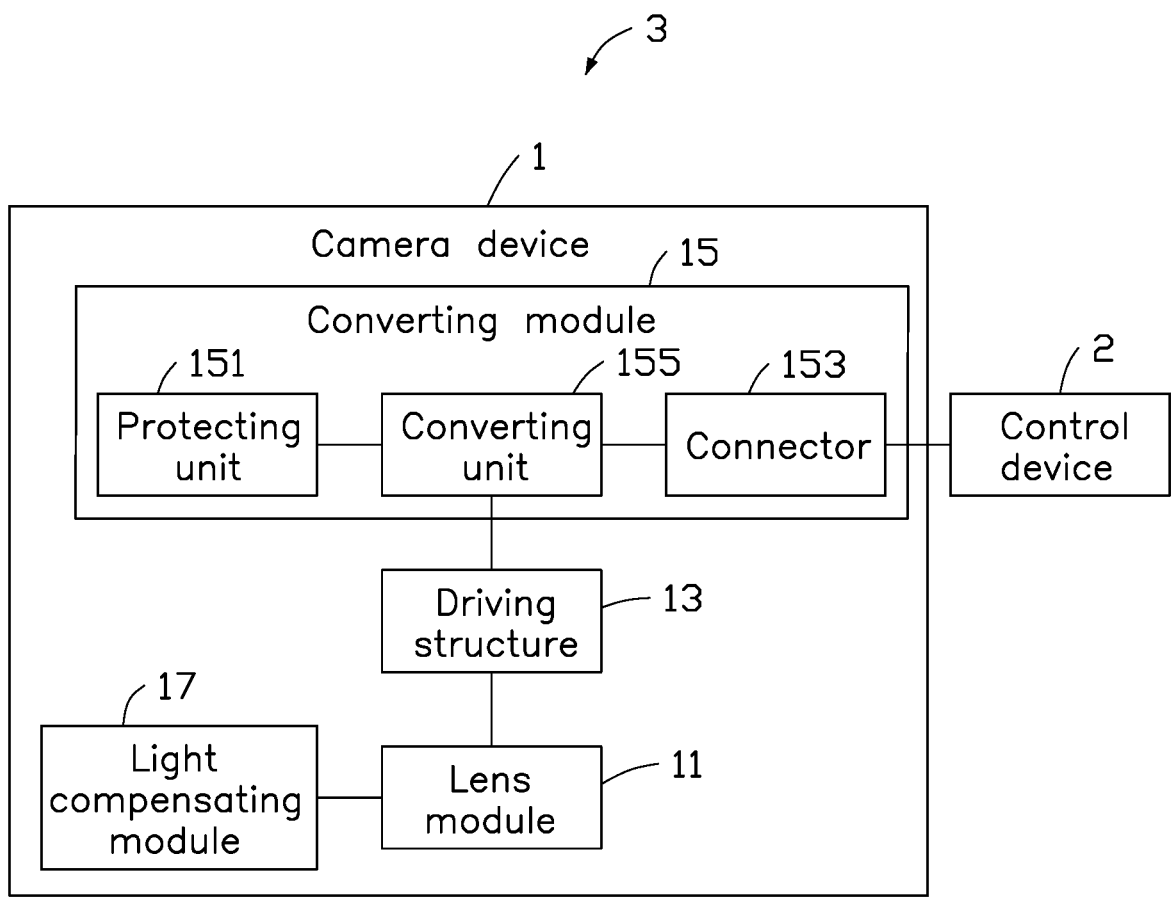
FIG. 1 shows architecture of one embodiment of an automatic focusing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

FIG. 1 shows architecture of one embodiment of a system for automatic focusing of a camera (automatic focusing system 3). The automatic focusing system 3 includes a camera device 1 and a control device 2. The camera device 1 is assembled inside a vehicle. The camera device 1 can be automatically focused for capturing an image under a control of the control device 2. In an embodiment, the control device 2 can be a car computer.

The camera device 1 includes a lens module 11, a driving structure 13, and a converting module 15.

The lens module 11 is positioned on a vehicle. The converting module 15 is configured to connect to the control device 2 and to receive a control signal sent by the control device 2. The driving structure 13 drives the lens module 11 to automatically focus according to the control signal. The driving structure 13 includes at least one shape memory alloy (SMA) wire 131. The control signal controls the SMA wire 131 to become energized or de-energized and so changes the focus of the lens module 11.

In an embodiment, the lens module 11 can be positioned at a preset position inside or on the exterior of the vehicle. The lens module 11 can capture an image inside the vehicle through an image sensor of the lens module 11. In an embodiment, the image can include human faces, such as the face of a driver or of a passenger. In other embodiment, the lens module 11 can also be positioned at a rear portion of the vehicle and can provide an image of the scene and surroundings behind the vehicle.

Figure 2A:
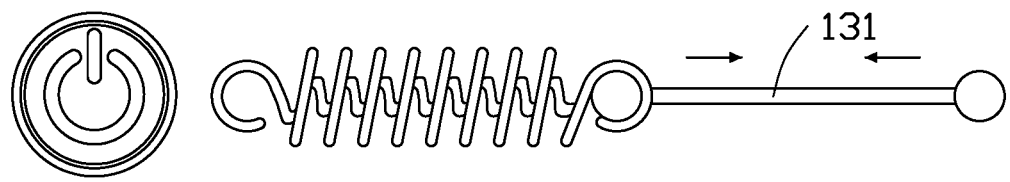
FIG. 2A is a schematic view of one embodiment of a SMA wire being energized.
Figure 2B:
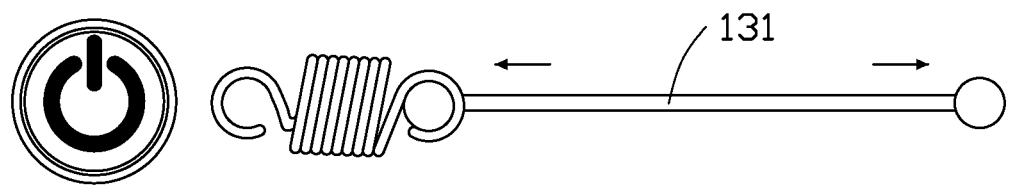
FIG. 2B is a schematic view of one embodiment of the SMA wire being de-energized.
Figure 3:
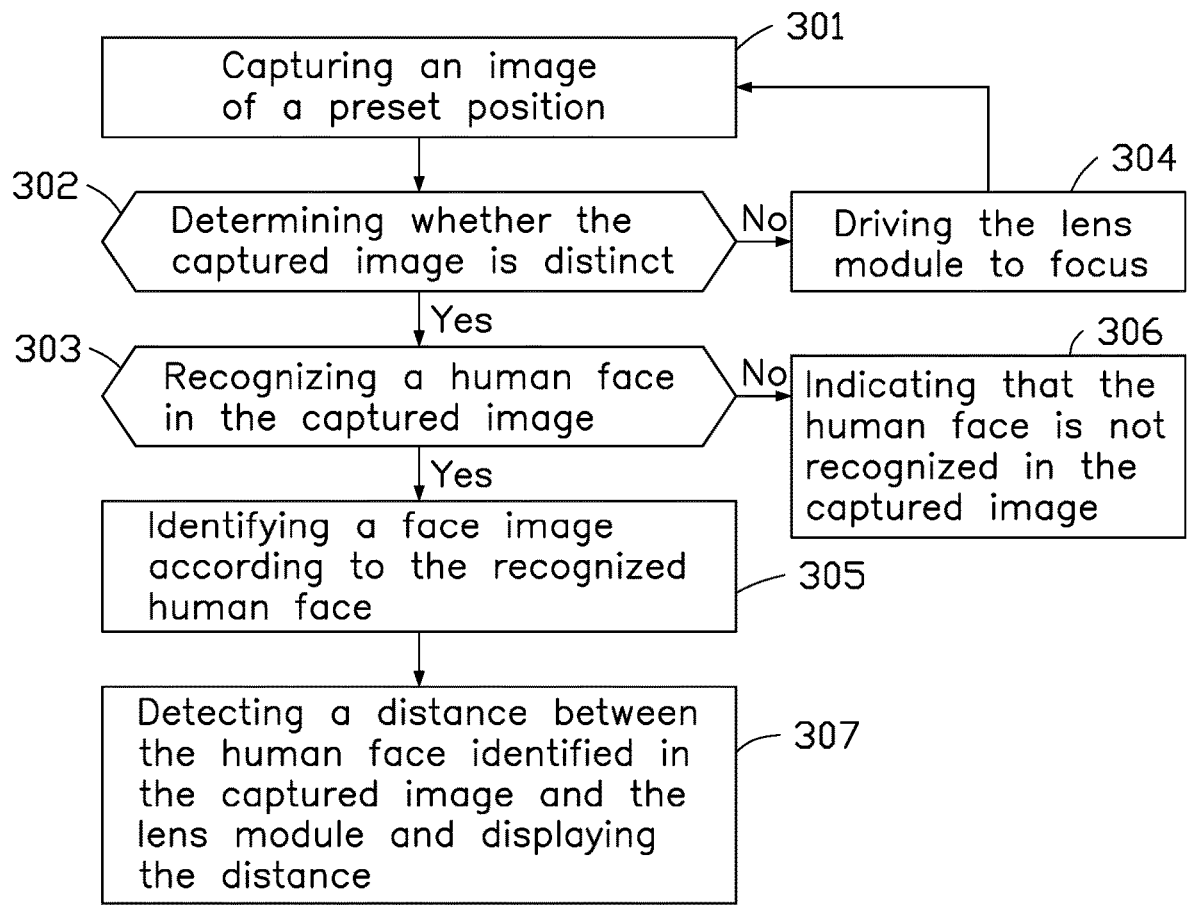
FIG. 3 is a flow chart of one embodiment of a method for automatic focusing.

Referring to FIG. 2A, when the SMA wire 131 of the driving structure 13 is energized, a temperature of the SMA wire 131 is increased, thus the SMA wire 131 contracts, that is, a length of the SMA wire 131 is shortened. Referring to FIG. 2B, When the SMA wire 131 of the driving structure 13 is de-energized, the temperature of the SMA wire 131 falls, thus the SMA wire 131 resumes its original length as the wire 131 cools thereby driving the lens module 11 to slide. Therefore, the control signal can focus the lens module 11 by controlling the SMA wire 131 to be energized or de-energized. In other embodiment, the driving structure 13 can also be other conventional motive structure as long as the lens module 11 can be driven to move, for example, a motor.

The converting module 15 includes a protecting unit 151, a connector 153, and a converting unit 155 electrically connected in series.

The protecting unit 151 is electrically connected to a power supply. The power supply provides a first voltage to the protecting unit 151. The protecting unit 151 converts the first voltage (for example, 5V) into a second voltage (for example, 3.3V) and outputs the second voltage to the converting unit 155. The protecting unit 151 protects the converting unit 155 against high voltage. The connector 153 is electrically connected to the control device 2. The connector 153 is configured to receive the control signal from the control device 2 and to send the control signal to the converting unit 155. The converting unit 155 is configured to convert a format of the control signal. In an embodiment, the control signal output by the control device 2 is a USB signal, and the connector 153 is a USB connector. The converting unit 155 converts the USB signal into an I2C signal, and sends the converted signal to the lens module 11. In addition, the converting unit 155 further provides an operating voltage to the lens module 11.

In other embodiment, the camera device 1 further includes a light compensating module 17. When the lens module 11 is activated, the lens module 11 controls the light compensating module 11 to provide optical compensation to the lens module 11. In this embodiment, the light compensating module 17 is an LED.

In FIG. 2, a flowchart in accordance with an embodiment is disclosed. The automatic focusing method of the automatic focusing system 3 can be carried out using the configurations illustrated in FIG. 1, for example, and various elements of these figures are referenced in the method. Each block shown in FIG. 2 represents one or more processes, methods or subroutines, carried out in the method. Furthermore, the illustrated order of blocks is by example only and the order of the blocks can change. Additional blocks may be added or fewer blocks may be utilized, without departing from this disclosure. The method can begin at block 301.

At block 301, when the image sensor of the lens module 11 is activated, the lens module 11 captures an image of the interior or a specific part of the interior of through the image sensor. Specifically, the control device 2 sends the control signal to the converting module 15 through the connector 153. The control signal is formatted and output to the lens module 11. The lens module 11 is activated to capture the image by the control signal.

In other embodiment, when the image sensor is activated, the lens module 11 is optically compensated by the light compensating module 17.

At block 302, the control device 2 determines whether the captured image is distinct. If the control device 2 determines that the image is distinct, the process goes to block 303. If the control device 2 determines that the image is not sufficiently distinct, the process goes to block 304. In this embodiment, the control device 2 determines whether the image is distinct according to a brightness value of the image. Specifically, the control device 2 presets a preset brightness range. If the brightness value of the captured image is outside the preset brightness range, the control device 2 determines that the captured image is not sufficiently distinct. If the brightness value of the captured image is within the preset brightness range, the control device 2 determines that the captured image is distinct.

At block 303, the control device 2 recognizes a human face in the captured image. If the face is recognized in the captured image, the process goes to block 305. If the human face is not recognized in the captured image, the process goes to block 306. In this embodiment, the control device 2 determines whether the face is recognized using conventional face recognition technology, for example, the control device 2 determines whether the human face is recognized according to whether facial features can be detected in the captured image.

At block 304, the control device 2 controls the driving structure 13 to focus the lens module 11. In this embodiment, the control device 2 drives the lens module 11 to focus according to a formula AF=(a*(X^b))+c (the AF formula), wherein AF represents a focusing distance of the lens module 11 (i.e., the distance between an object and the lens module), X represents a moving distance of the lens module 11, X^b represents the bth power of X, and a, b, and c are parameters of the lens module 11 as manufactured. During focusing, the moving position X is preset, and the parameters of a, b, and c are constants, for example, when X=0.7, a=0.00372, b=−1.031, and c=−0.00583. According to the AF formula, the focusing distance AF=−0.00046 can be calculated, and then the lens module 11 is driven to focus at the focusing distance AF. After focusing, blocks 301 and 302 can be repeated until an acceptable image is obtained, and the process goes to block 303.

At block 305, the human face is recognized in the captured image. For example, the control device 2 can determine that facial features can be detected in the captured image. The control device 2 identifies a face image according to the recognized human face. The face image can be a portion of the captured image. In an embodiment, the control device 2 marks the human face image with a virtual frame around the human face.

At block 306, the human face is not recognized as such in the captured image. For example, the control device 2 can determine that no facial features can be detected in the captured image. The control device 2 can indicate that the human face is not recognized in the captured image.

At block 307, the control device 2 detects a distance between the face identified in the image and the lens module 11, and the control device 2 also displays the distance. The distance between the identified human face and the lens module 11 is equal to the required focusing distance of the lens module 11. Therefore, in this embodiment, the control device 2 can calculate the distance between the identified human face in the image and the lens module 11 according to the AF formula.

The camera device 1, and the automatic focusing system 3 use the method to realize an autofocus function of the lens module 11, the method employs SMA characteristics of the driving structure 13. Thus, the image device 1 can obtain images of sufficient distinctness to satisfy all requirements.

It is to be understood, however, that even through numerous characteristics and advantages of the present disclosure have been set forth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. An automatic focusing system comprising:
a control device; and
a camera device, comprising:
a lens module configured to be assembled inside a vehicle;
a driving structure, comprising at least one shape memory alloy wire (SMA wire); and
a converting module configured to connect to a control device and to receive a control signal from the control device, wherein the control signal controls the SMA wire to become energized or de-energized thereby changing the focus of the lens module;
wherein the control device drives the lens module to focus according to the formula AF=(a*(X^b))+c, wherein AF represents a focusing distance of the lens module, X represents a moving distance of the lens module, X^b represents the bth power of X, and a, b, and c are parameters of the lens module; and wherein, during focusing, the moving distance X is preset, the parameters of a, b, and c are constants, the focusing distance AF is calculated according to the formula AF=(a*(X^b))+c, the lens module is driven to focus at the focusing distance AF.

2. The automatic focusing system of claim 1, wherein when the SMA wire of the driving structure is energized, a temperature of the SMA wire is increased, the SMA wire contracts and a length of the SMA wire is shortened, when the SMA wire of the driving structure is de-energized, the temperature of the SMA wire falls, the SMA wire resumes an original length thereby driving the lens module to slide for changing the focus of the lens module.

3. The automatic focusing system of claim 1, wherein the control device is configured to determine whether a captured image is distinct, if the control device determines that the image is not distinct, the control device controls the driving structure to drive the lens module to move and to focus.

4. The automatic focusing system of claim 3, wherein the control device presets a preset brightness range, if a brightness value of the captured image is outside the preset brightness range, the control device determines that the captured image is not distinct, if the brightness value of the captured image is within the preset brightness range, the control device determines that the captured image is distinct.

5. The automatic focusing system of claim 3, wherein if the control device determines that the image is distinct, the control device recognizes a human face in the captured image, if the human face is recognized in the captured image, the control device identifies a face image according to the recognized human face.

6. The automatic focusing system of claim 5, wherein the control device identifies a human face image by marking the human face image with a virtual frame around the human face.

7. The automatic focusing system of claim 5, wherein the control device further detects a distance between the human face identified in the captured image and the lens module, and the control device also displays the distance.

8. A automatic focusing method for an automatic focusing system, the automatic focusing system comprising a camera device having a lens module and a control device, the method comprising:
    capturing an image of a preset position by the camera device;
    determining whether the captured image is distinct; and
    driving the lens module to focus according to a formula $AF=(a*(X^b))+c$ if the captured image is determined not distinct, wherein AF represents a focusing distance of the lens module, X represents a moving distance of the lens module, $X^b$ represents the bth power of X, and a, b, and c are parameters of the lens module; and wherein, during focusing, the moving distance X is preset, the product parameters of a, b, and c are constants.

9. The automatic focusing method of claim 8, further comprising:
    recognizing a human face in the captured image if the captured image is determined to be distinct; and
    identifying a face image according to the recognized human face if the human face is recognized in the captured image.

10. The automatic focusing method of claim 9, wherein the method of identifying a human face image comprises:
    marking the face image with a virtual frame around the face.

11. The automatic focusing method of claim 9, further comprising:
    detecting and displaying a distance between the human face identified in the image and the lens module; and
    displaying the distance.

12. The automatic focusing method of claim 8, wherein the method of determining whether the captured image is distinct and of sufficient clarity comprises:
    presetting a preset brightness range;
    determines the captured image is not distinct if a brightness value of the captured image is outside the preset brightness range; and
    determines the captured image is distinct if the brightness value of the captured image is within the preset brightness range.

* * * * *